Aug. 23, 1927.
L. H. GILLICK
FLEXIBLE JOINT
Original Filed July 26, 1920
1,639,800
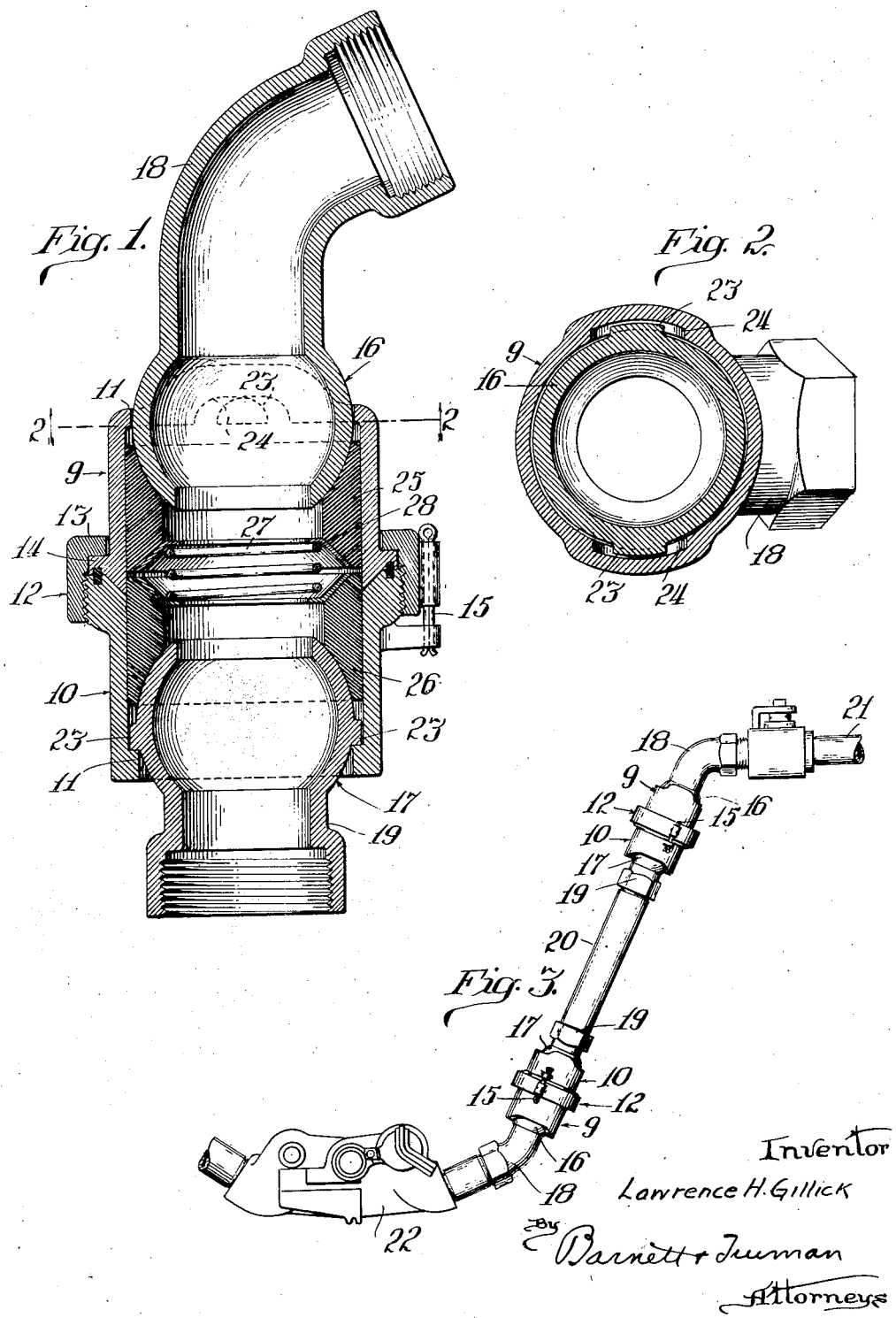
Inventor
Lawrence H. Gillick
By Barnett + Truman
Attorneys Patented Aug. 23, 1927.

1,639,800

UNITED STATES PATENT OFFICE.

LAWRENCE H. GILLICK, OF ST. PAUL, MINNESOTA, ASSIGNOR TO VAPOR CAR HEATING COMPANY, INC., OF CHICAGO, ILLINOIS, A CORPORATION OF NEW YORK.

FLEXIBLE JOINT.

Original application filed July 26, 1920, Serial No. 398,882. Divided and this application filed July 2, 1925. Serial No. 41,052.

My invention relates to flexible couplings or pipe joints of the type employing ball and socket members, the joint being intended especially for conduits subject to rather high internal fluid pressure. The primary objects of the invention are: To provide a joint which will be flexible even when the fluid pressure therein is very high, and which will also be fluid tight and so remain after continued periods of service; to provide a joint which can be re-packed, when necessary, without disconnecting the flexible joint structure entirely from the conduit or pipe line with which it is associated; to provide a joint, the members of which will have a wider range of angular movement than possessed by the usual so-called universal joints; to provide a simple arrangement whereby the members of the joint will have capacity for swivel movement, as between each other, as well as angular movement; to construct and dispose the parts of the joint so that the weight of the parts is not imposed on the packing whereby easy flexibility is insured and the packing has capacity for self-adjustment under fluid or spring pressure, or both, against the ball members of the joint; and in other respects to be hereinafter noted, to provide an improved flexible joint for use on railway trains, for example, in place of the usual rubber hoses connecting the train pipe sections or in other situations where lightness, compact structure, strength and flexibility over wide ranges are requisite.

The invention is illustrated in certain preferred embodiments, in the accompanying drawing:

Figure 1 is a longitudinal sectional view through my improved joint structure.

Fig. 2 is a transverse section taken on line 2—2 of Fig. 1; and

Fig. 3 is a fragmentary view in side elevation showing a train line connection comprising my improved flexible joint structure.

Referring to the several figures of the drawing,—9 and 10 indicate socket members, each of internally cylindrical form with an inwardly extending flange 11 at one end, said two members being secured together by a union 12 mounted by means of screw threads upon the section 10 and having an inwardly extending flange 13 in engagement with an outwardly extending flange 14 formed on the section 9. The union 12 is held from loosening on the section 10 by means of a cotter pin 15 passing through suitable openings in the two parts.

Within the socket formed by the members 9 and 10, I have provided two ball or globular members 16 and 17, one at each end of the socket, the ball member 16 being provided with a neck portion 18 turned at an angle for convenient use in the installation illustrated, while the ball member 17 is provided with a straight neck portion 19. In Fig. 3, I have shown a portion of an all-metal flexible pipe connection between the steam train pipe of two railway cars and embodying my improved construction. In this construction, two of the flexible joint structures are employed, connected together by means of a pipe 20, the end portion of a train pipe 21 being shown at the top and a hose coupler 22 at the bottom.

The ball members 16 and 17 are held adjustably in position within the socket by means of circular lugs 23, which project at opposite sides of the ball members into elongated notches or recesses 24 formed on the inner faces of the flanges 11, the arrangement being such that the ball is able to have either a swinging motion about the lugs 23 or a swiveling motion about the longitudinal axis of the socket. The lugs 23 and recesses 24 for one ball are preferably arranged at right angles to the lugs and recesses for the other ball.

Between the inner ends of the ball members 16 and 17, I have provided packing members or gaskets 25 and 26 slidably mounted within the socket member and having curved surfaces bearing against the adjacent curved faces of the ball members. These gaskets are to be formed of rubber, rubber composition, or other material of a type that is somewhat soft and resilient as compared with the metal parts of the device, or of a type that will soften under the influence of heat under conditions such as exist in a train pipe joint in use, as for example rubber compositions of the Jenkins material type.

While fluid pressure, especially when the joint is used on a steam or air line, will ordinarily be sufficient to keep the gaskets in sealing contact with the ball members and the socket member, the gasket in each case extending a substantial distance inwardly from the ball to permit such sealing against the socket by radial expansion, I prefer to arrange a coiled spring 27 between the gaskets, the spring 27 being preferably provided with annular disks 28 providing the bearings against the gaskets. Moreover, the spring keeps the gaskets in proper position when the joint is not subject to fluid pressure.

The rings or disks 28 are conical in form, with flanges for the ends of the spring 27, and bear against correspondingly beveled faces on the ends of the gaskets so that the pressure of the spring not only forces the gaskets longitudinally against the ball members 16 and 17 but also expands their inner ends against the socket member, thus insuring close contact between the gaskets and the corresponding ball and socket members.

With a joint so constructed, the angular movement of each ball member with respect to the socket member may be considerable, because the socket member does not directly engage the ball members, (the engagement between them being made by the lug and recess connection) so that the portions of the socket member limiting the angular movements of the ball member need not project beyond or even to, the line of maximum transverse diameter of the ball member.

The pivotal connections between the socket members and the ball members take the stress as between said members which results from the internal fluid pressure, and also relieves the gaskets of the weight of the parts of the joint. This gives the joint easy flexibility even when the internal pressure is high, since the articulated parts, the ball and socket members, do not bear on each other at all in the sense that the ordinary ball and socket members bear upon each other, the engagement between the socket and the balls being limited to the pivotal connections by which the friction is minimized. In this construction, the packing is self-feeding and self-adjusting against the surfaces of the ball members, so that wear on the gaskets does not bring about a leaky condition of the joint.

This application is being filed as a division of my co-pending application, Serial No. 398,882, filed July 26, 1920.

I claim:

1. A flexible joint comprising two internally cylindrical socket members, a ball member in the outer end of each socket member, means for preventing withdrawal of the ball members through the outer ends of the socket members and serving to permit a limited swinging motion and a limited rotary motion of the ball members within the socket members, a flanged union secured by screw threads upon one of said socket members and embracing a flange upon the other socket member for securing said two members detachably together, and gaskets slidably mounted between said ball members and movable in opposite directions into contact with the ends of said ball members respectively.

2. A flexible joint comprising two internally cylindrical socket members, a ball member in the outer end of each socket member, means for preventing withdrawal of the ball members through the outer ends of the socket members and serving to permit a limited swinging motion and a limited rotary motion of the ball members within the socket members, a flanged union secured by screw threads upon one of said socket members and embracing a flange upon the other socket member for securing said two members detachably together, means for locking the union in tightened postion on the socket member, and gaskets slidably mounted between said ball members and movable in opposite directions into contact with the ends of said ball members respectively.

3. A flexible joint comprising two socket members, a ball member at the outer end of each socket member of a size to stand out of contact therewith about the greater portion of its periphery, means for preventing withdrawal of the ball members through the outer ends of the socket members comprising projections on one member engaging elongated recesses in the other member, so that the ball member is adapted to have a limited swinging motion and a limited rotary motion with respect to the socket member, means for securing said two socket members detachably together, and packing means interposed between said ball members adapted to close the space between the ball members and the socket members for making a tight joint.

4. In a flexible pipe joint, the combination of a substantially cylindrical socket member, a ball member projecting into the socket member and having a diametrically arranged pair of outstanding curved projections, the socket member being formed with elongated recesses into which the projections on the ball extend to hold the ball within the socket, but permit limited swinging and rotary movements of the ball, and packing means within the socket adapted to close the space between the ball and socket for making a tight joint.

5. In a flexible pipe joint, the combination of a substantially cylindrical socket member, a ball member projecting into the socket member and having a diametrically arranged pair of outstanding curved projections, the socket member being formed with elongated recesses into which the projections on the ball extend to hold the ball within the socket, but permit limited swinging and rotary movements of the ball, and a gasket slidable within the socket into engagement with the ball for sealing the joint between these members.

6. In a flexible pipe joint, the combination of a substantially cylindrical socket member, a pair of ball members, one projecting into each end of the socket member, each ball member having a diametrically arranged pair of outstanding curved projections, the socket member being formed with elongated recesses into which the projections extend, to hold the balls within the socket but permit swinging and rotary movement of the balls therein, and a packing means within the socket member having surfaces bearing against the ball members respectively.

7. In a flexible pipe joint, the combination of a substantially cylindrical socket member, a pair of ball members, one projecting into each end of the socket member, each ball member having a diametrically arranged pair of outstanding curved projections, the projections on one ball member extending at right-angles to the projections on the other ball member, the socket member being formed with recesses into which the projections extend, and a packing means within the socket member having surfaces bearing against the ball members respectively.

8. In a flexible pipe joint, the combination of a substantially cylindrical socket member, a pair of ball members, one projecting into each end of the socket member, each ball member having a diametrically arranged pair of outstanding curved projections, the socket member being formed with recesses into which the projections extend, the recesses being elongated circumferentially of the cylinder to permit limited swiveling movement of the balls in the socket, and a packing means within the socket member having surfaces bearing against the ball members respectively.

9. In a flexible pipe joint, the combination of a substantially cylindrical socket member, a pair of ball members, one projecting into each end of the socket member, each ball member having a diametrically arranged pair of outstanding curved projections, the projections on one ball member extending at right-angles to the projections on the other ball member, the socket member being formed with recesses into which the projections extend, the recesses being elongated circumferentially of the cylinder to permit limited swiveling movement of the balls in the socket, and a packing means within the socket member having surfaces bearing against the ball members respectively.

10. A flexible joint comprising two internally cylindrical socket members, means for securing said two members detachably together, a ball member extending into the outer end of each socket member and of a size to stand out of contact with the socket throughout the greater portion of its periphery, each ball member having a diametrically arranged pair of outstanding projections, the socket members being formed with recesses elongated circumferentially of the cylinder into which the projections extend to permit limited swiveling movement of the balls in the sockets, and a packing means within the socket members having surfaces bearing against the ball members respectively.

11. A flexible joint comprising two internally cylindrical socket members, means for securing said two members detachably together, a ball member extending into the outer end of each socket member and of a size to stand out of contact with the socket throughout the greater portion of its periphery, each ball member having a diametrically arranged pair of outstanding projections, the projections on one ball member extending at right-angles to the projections on the other ball member, the socket members being formed with recesses elongated circumferentially of the cylinder into which the projections extend to permit limited swiveling movement of the balls in the sockets, and a packing means within the socket members having surfaces bearing against the ball members respectively.

12. A flexible joint comprising an internally cylindrical socket member, a ball member projecting into the socket member but out of contact therewith throughout the greater portion of its periphery, the ball member having a diametrically arranged pair of outstanding projections, there being recesses in the socket member elongated circumferentially of the cylinder into which the projections extend, to permit limited swiveling movements of the ball in the socket, and a packing means within the socket member having a surface bearing against the ball.

LAWRENCE H. GILLICK.